No. 653,723. Patented July 17, 1900.
D. WILLIAMSON.
PUMP FOR AUTOMATICALLY INFLATING PNEUMATIC TIRES.
(Application filed May 17, 1900.)
(No Model.)

Inventor:
Daniel Williamson,

Witnesses:

UNITED STATES PATENT OFFICE.

DANIEL WILLIAMSON, OF SUNBURY, PENNSYLVANIA.

PUMP FOR AUTOMATICALLY INFLATING PNEUMATIC TIRES.

SPECIFICATION forming part of Letters Patent No. 653,723, dated July 17, 1900.

Application filed May 17, 1900. Serial No. 17,019. (No model.)

*To all whom it may concern:*

Be it known that I, DANIEL WILLIAMSON, a citizen of the United States, residing at Sunbury, in the county of Northumberland and State of Pennsylvania, have invented certain new and useful Improvements in Pumps for Automatically Inflating Pneumatic Tires; and I do declare the following to be a full, clear, and exact description of the invention, such as will enable others skilled in the art to which it appertains to make and use the same.

The invention relates to pumps for automatically inflating pneumatic tires, and more particularly to that class of pumps adapted to be connected to a vehicle-wheel and be operated by the rotation of said wheel to inflate the tire when occasion requires.

The object of the invention is to provide a pump of this character which shall be simple of construction, durable in use, comparatively inexpensive of production, and efficient in operation.

With this and other objects in view the invention consists in certain features of construction and combination of parts, which will be hereinafter fully set forth.

Figure 1:
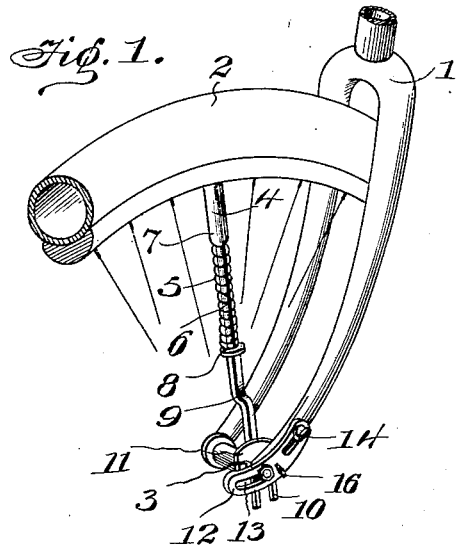
Figure 2:
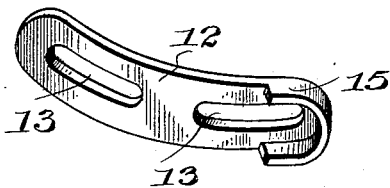
Figure 3:
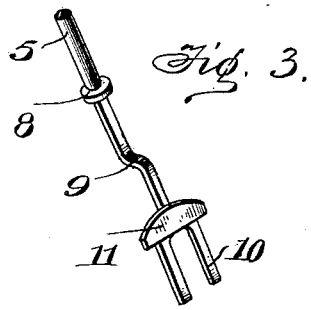

In the accompanying drawings, Figure 1 is a perspective view of a portion of a bicycle-wheel and the front fork of the frame, illustrating my invention. Fig. 2 is a detail perspective view of the cam-bracket, taken from the under side; and Fig. 3 is a similar view of the upper end of the pump-rod.

In the drawings, 1 denotes the frame of a vehicle, which in the present instance is represented as the front fork of a bicycle-frame.

2 denotes a wheel which is journaled to the front fork in the usual manner and is preferably provided with a radial guide-groove 3.

4 denotes the pump, which is connected to the rim of the wheel and has its pump-rod 5 normally held elevated by a coil-spring 6, confined between the barrel 7 of the pump and a shoulder 8, secured to the pump-rod. The pump-rod is offset at 9 and has its inner end forked, as shown at 10, the arms of the fork embracing the axle of the wheel and engaging the sides of the guide-groove in which it moves.

11 denotes a cross-head secured to the pump-rod at a point between its forked end and the shoulder thereon.

12 denotes a cam-bracket which is preferably curved to conform to the contour of the lower end of the fork and is provided with curved slots 13, one to receive the axle of the wheel and the other to receive a set-screw 14 for locking the bracket in adjustment. The lower end of the cam-bracket is provided with a cam-lug 15, which is adapted to be lowered into the path of movement of the cross-head and be held in that position by the aforesaid set-screw. In the revolution of the wheel the cross-head will engage the cam-lug and thus depress the pump-rod in one direction, while the coil-spring will move the pump-rod in the opposite direction, thus reciprocating said rod and charging the tire with compressed air.

After the tire has been properly inflated the cam-bracket is raised vertically by the finger-piece 16 and is locked in its elevated position by the set-screw, so that in the revolution of the wheel the cam-lug will be out of the path of movement of the cross-head and the pump remain at rest.

From the foregoing description, taken in connection with the accompanying drawings, the construction, operation, and advantages of my invention will be readily understood without requiring an extended explanation.

Various changes in the form, proportion, and the minor details of construction may be resorted to without departing from the principle or sacrificing any of the advantages of this invention.

Having thus fully described my invention, what is claimed as new, and desired to be secured by Letters Patent, is—

The combination with the frame of a vehicle, of a wheel journaled thereto and provided with a pneumatic tire, a pump carried by said wheel for inflating the tire, said pump being provided with a spring-actuated pump-rod the upper end of which is offset and is formed with a fork to engage the journal of the wheel and be guided thereby in its movement, a cross-head secured to the forked end of the pump-rod, and a cam-bracket adjustably secured to the frame of the vehicle and adapted to be moved in the path of movement of the cross-head, substantially as set forth.

In testimony whereof I have hereunto set my hand in presence of two subscribing witnesses.

DANIEL WILLIAMSON.

Witnesses:
C. A. SIDLER,
C. A. GULICK.